C. A. JANSON.
DIFFERENTIAL TRANSMISSION MECHANISM.
APPLICATION FILED NOV. 20, 1912.
1,103,048.
Patented July 14, 1914.
2 SHEETS—SHEET 1.
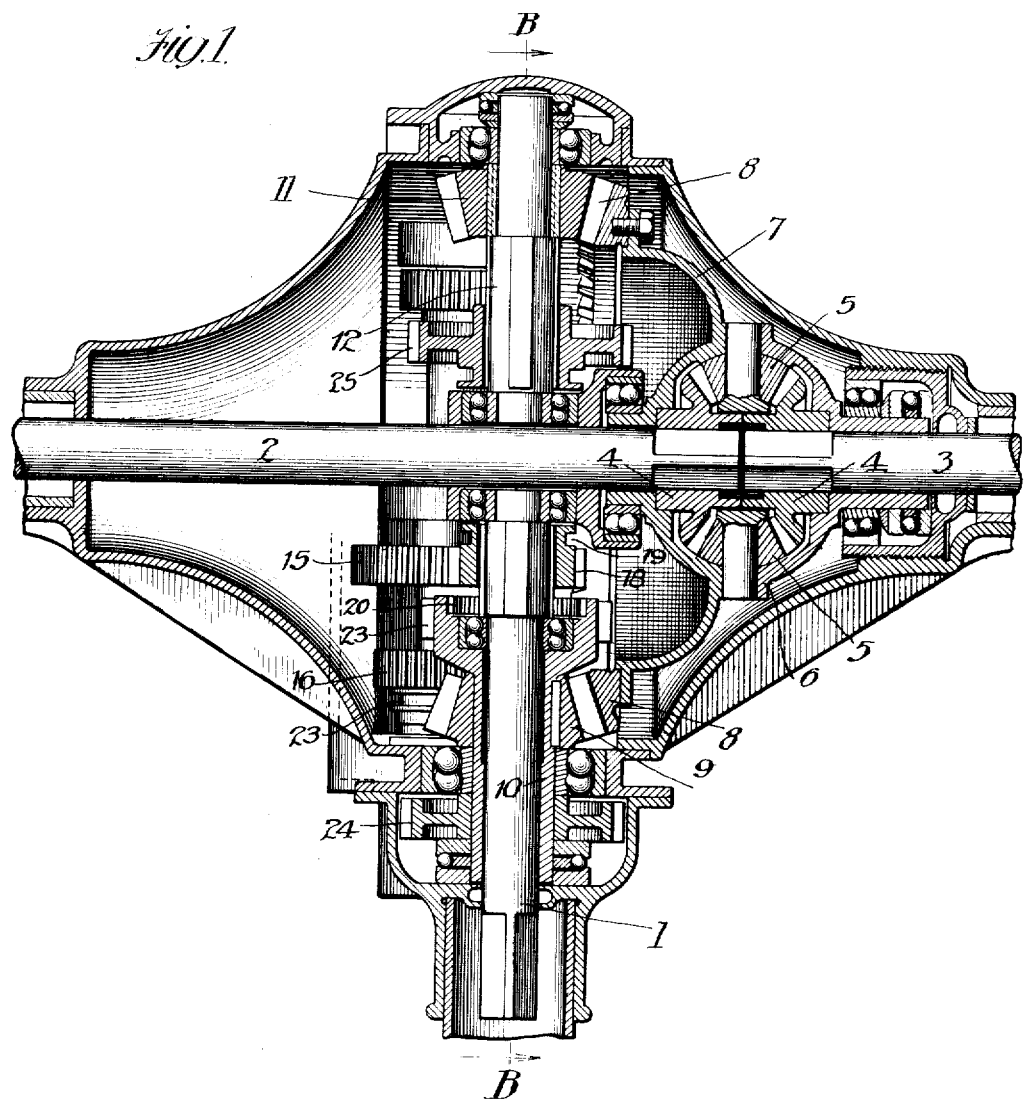

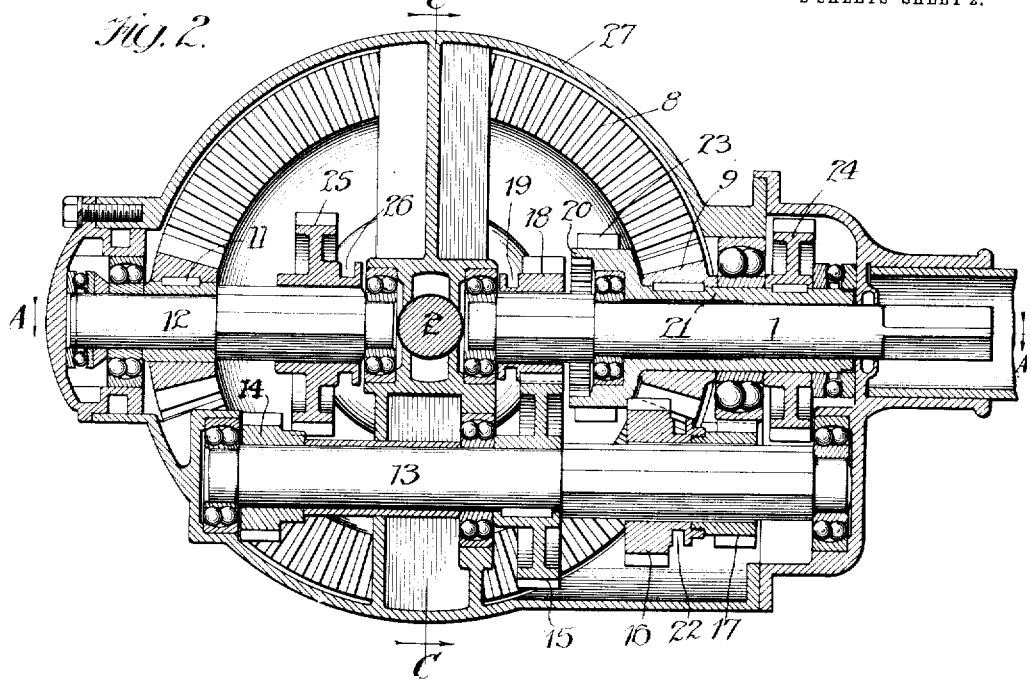
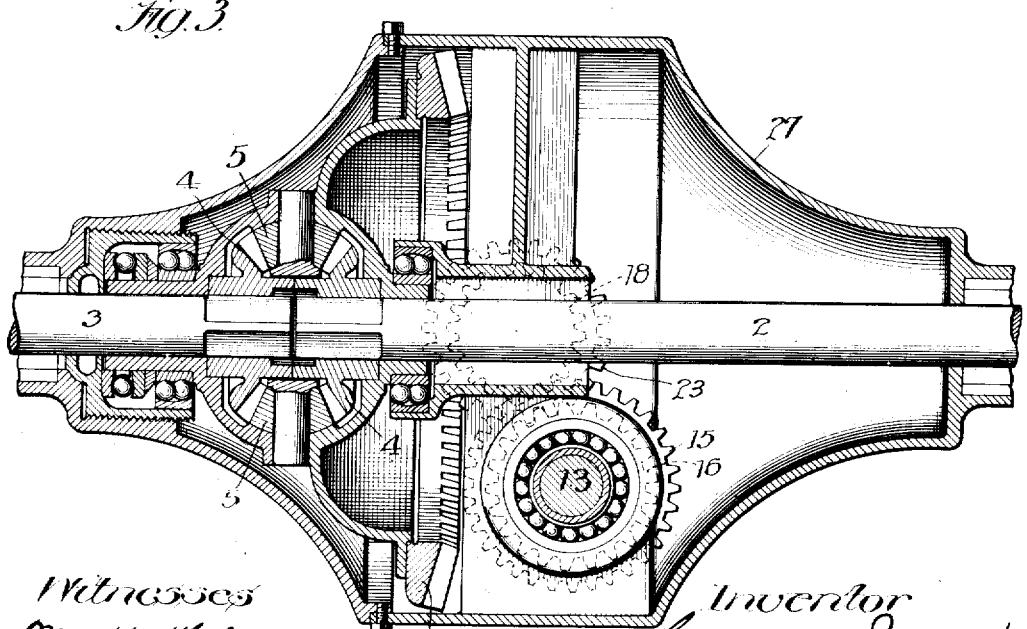

UNITED STATES PATENT OFFICE.

CARL AUGUST JANSON, OF ROCKFORD, ILLINOIS, ASSIGNOR OF ONE-FIFTH TO AXEL R. NEWBERG, OF CHICAGO, ILLINOIS.

DIFFERENTIAL TRANSMISSION MECHANISM.

1,103,048.  Specification of Letters Patent.  Patented July 14, 1914.

Application filed November 20, 1912. Serial No. 732,510.

*To all whom it may concern:*

Be it known that I, CARL AUGUST JANSON, subject of the King of Sweden, and a resident of Rockford, county of Winnebago, State of Illinois, have invented certain new and useful Improvements in Differential Transmission Mechanisms, of which the following is a specification.

The main objects of this invention are to provide an improved and compact arrangement of the power transmission mechanism of motor vehicles, whereby the differential gearing and the speed changing mechanism may all be covered in a compact casing but little larger than the casing which is required by the usual forms of differential gearing alone; and to provide a mechanism of this kind whereby the intermediate shafting between the transmission mechanism and the differential gearing may be eliminated.

A specific embodiment of this invention is illustrated in the accompanying drawings, in which:

Figure 1 is a sectional plan showing the general arrangement of the parts, the section being taken in the plane of the driving and driven shafts, which plane is indicated by the line A—A of Fig. 2. Fig. 2 is a section taken on the line B—B of Fig. 1. Fig. 3 is a section taken on the line C—C of Fig. 2.

In the construction shown, the shaft 1 represents the main driving shaft, which in the case of a motor vehicle would be connected to the engine through a line of shafting and clutch (not shown). The shafts 2 and 3, which will be herein referred to as the driven shafts, may be the driving axles of a vehicle. These are connected together by differential gearing comprising pinions 4 mounted directly on the adjacent ends of the shafts 2 and 3, and having between them a pair of planetary gears 5 journaled on a rotary member 6, which, in the form shown, is directly connected by a web 7 with a bevel gear 8, which in turn is driven by a pinion 9 keyed to a quill shaft 10 on the driving shaft 1. A second pinion 11 also meshes with the gear 8, and is carried by a shaft 12 journaled in alinement with the shaft 1.

Journaled in parallel relation to the shafts 1 and 12, and lying at one side of the plane of the shafts 1, 12, and 2, is a counter-shaft 13 provided with a plurality of speed changing gears 14, 15, 16, and 17. A sliding gear 18 is splined on the inner end of the shaft 1, and meshes with the gear 15. The gear 18 has its hub extended at one side and provided with a groove 19, adapted to engage a suitable shifting device (not shown), for shifting the gear 18 into and out of mesh with a clutch member 20, which has internal teeth and recesses adapted to mesh with the teeth of the gear 18, and which is directly connected with the quill 10 on the shaft 1. The member 20 is in axial alinement with the gear 18, and is so located that the gear 18 may be thrown into and out of engagement with it without passing out of engagement with the gear 15.

The intermediate speed gear 16 and the low speed gear 17 are directly connected together, so as to move as a unit, and are splined on the shaft 13. The hub or collar of one of them is provided with a groove 22 for engaging a shifting fork (not shown). The intermediate speed gear 16 meshes with a gear 23 rigid on the quill 10, and the low speed gear 17 is movable into and out of mesh with a gear 24 also rigidly mounted on the quill 10.

The reversing mechanism comprises the bevel gear 11, the shaft 12, the gear 14 on the counter-shaft 13, and the gear 25 splined on the shaft 12 and provided with an extended hub having a groove 26 for engaging a suitable shifting device (not shown). As shown, the shafts are journaled in suitable ball-bearings, and all are mounted in compact relation to each other in a casing or housing 27.

The operation of the device shown is as follows: For full speed ahead the gear 18 is shifted into driving engagement with the clutch member 20, and thus rigidly connects the driving shaft 1 with the quill 10. The bevel gear 9, carried by the quill 10, drives the bevel gear 8, which, through the planetary gears 5 and the bevel gears 4, drives the shafts 2 and 3 in the usual differential relation to each other. For intermediate speed ahead, the gear 18 is shifted out of mesh with the clutch member 20, and the gear 16 is shifted into mesh with the gear 23, whereupon the bevel gear 9 and the mechanism thereby is driven at a slower speed than when directly connected with the shaft 1. Similarly for slow speed ahead, the gear 18 remains out of mesh with the clutch member 20, but the gear 17 is shifted into mesh with the gear 24. This shifting of the gear 17 shifts the gear 16 out of mesh with the gear 23, since the gears 16 and 17 are connected together.

For reversing the rotation of the shafts 2 and 3, the gears 16 and 17 are shifted to the intermediate position in which they are shown in Fig. 2, and the gear 25 is shifted into mesh with the gear 14. In this arrangement shaft 1 drives shaft 13 through gears 18 and 15, and shaft 13 drives shaft 12 through gears 14 and 25, and shaft 12 drives shafts 2 and 3 through bevel gears 11 and 8 and the differential gears 4 and 5.

Although but one specific embodiment of this invention has been herein shown and described, it will be understood that numerous details of the construction shown may be altered or omitted without departing from the spirit of this invention as defined by the following claims.

I claim:

1. In a transmission mechanism, the combination with a drive shaft, of a gear loose thereon, a driven shaft, a gear having connections for driving said driven shaft and meshing with said first mentioned gear, speed changing gears, means for connecting the gear loose on the drive shaft directly thereto or to the speed changing gears and coöperating with certain of the above-named elements whereby said drive shaft may operate the driven shaft in a reverse direction.

2. In a transmission mechanism, the combination with a drive shaft, of a gear loose thereon, a driven shaft, a gear having connections for driving said driven shaft and meshing with said first mentioned gear, speed changing gears, means for connecting the gear loose on the drive shaft directly thereto or to the speed changing gears, and a counter shaft in alinement with said drive shaft having connections for driving said driven shaft in a reverse direction.

3. The combination of a driving shaft, a quill surrounding the same and rotatable thereon, a countershaft journaled in parallel relation to said driving shaft, means coöperating with said counter-shaft to connect said driving shaft to said quill, a pair of driven shafts, differential gearing connecting said quill to said driven shafts, said means including a shiftable member located between said quill and said driven shafts and movable between a position for connecting said driving shaft directly to said quill and a position for connecting said driving shaft and said countershaft.

Signed at Chicago this 12th day of November 1912.

CARL AUGUST JANSON.

Witnesses:
EUGENE A. RUMMLER,
AXEL R. NEWBERG.

It is hereby certified that in Letters Patent No. 1,103,048, granted July 14, 1914, upon the application of Carl August Janson, of Rockford, Illinois, for an improvement in "Differential Transmission Mechanisms," errors appear in the printed specification requiring correction as follows: Page 1, line 106, after the word "mechanism" insert the word *operated;* page 2, line 31, after the word "and" insert the word *means;* and that the said Letters Patent should be read with these corrections therein that the same may conform to the record of the case in the Patent Office.

Signed and sealed this 11th day of August, A. D., 1914.

[SEAL.]

J. T. NEWTON,
*Acting Commissioner of Patents.*